United States Patent [19]

Franco

[11] Patent Number: 4,873,786
[45] Date of Patent: Oct. 17, 1989

[54] BUG WHACKER LIGHT

[76] Inventor: Nicholas N. Franco, 3380 NW. 46 Ave., Lauderdale Lakes, Fla. 33319

[21] Appl. No.: 220,722

[22] Filed: Jul. 18, 1988

[51] Int. Cl.$^4$ .......................... A01M 1/04; A01M 1/22; F21V 33/00; H05C 3/00
[52] U.S. Cl. ........................................ 43/112; 43/113; 362/253
[58] Field of Search .................... 43/112, 113; 362/253

[56] References Cited

U.S. PATENT DOCUMENTS

| | | | |
|---|---|---|---|
| 914,875 | 3/1909 | Peterson | 43/112 |
| 1,852,923 | 4/1932 | Folmer et al. | 43/112 |
| 1,962,420 | 6/1934 | Bradley | 43/112 |
| 1,962,439 | 6/1934 | Folmer et al. | 43/112 |
| 2,132,371 | 10/1938 | Kriwat et al. | 43/112 |
| 2,674,682 | 4/1954 | Hanson | 43/112 |

Primary Examiner—Nicholas P. Godici
Assistant Examiner—William Scott Andes
Attorney, Agent, or Firm—Richard L. Miller

[57] ABSTRACT

This light device is designed to attract and kill insects by high voltage. Primarily, it consists of a large bulb shaped housing received in a common electric socket, and a smaller bulb is received in one of a pair of compartments for insect attraction. A second compartment of the pair includes a pair of extending electrodes for high voltage discharge killing of the insects, and a step-up transformer is electrically connected to the electrodes and is mounted in a neck portion of the large bulb.

5 Claims, 1 Drawing Sheet

U.S. Patent  Oct. 17, 1989  4,873,786
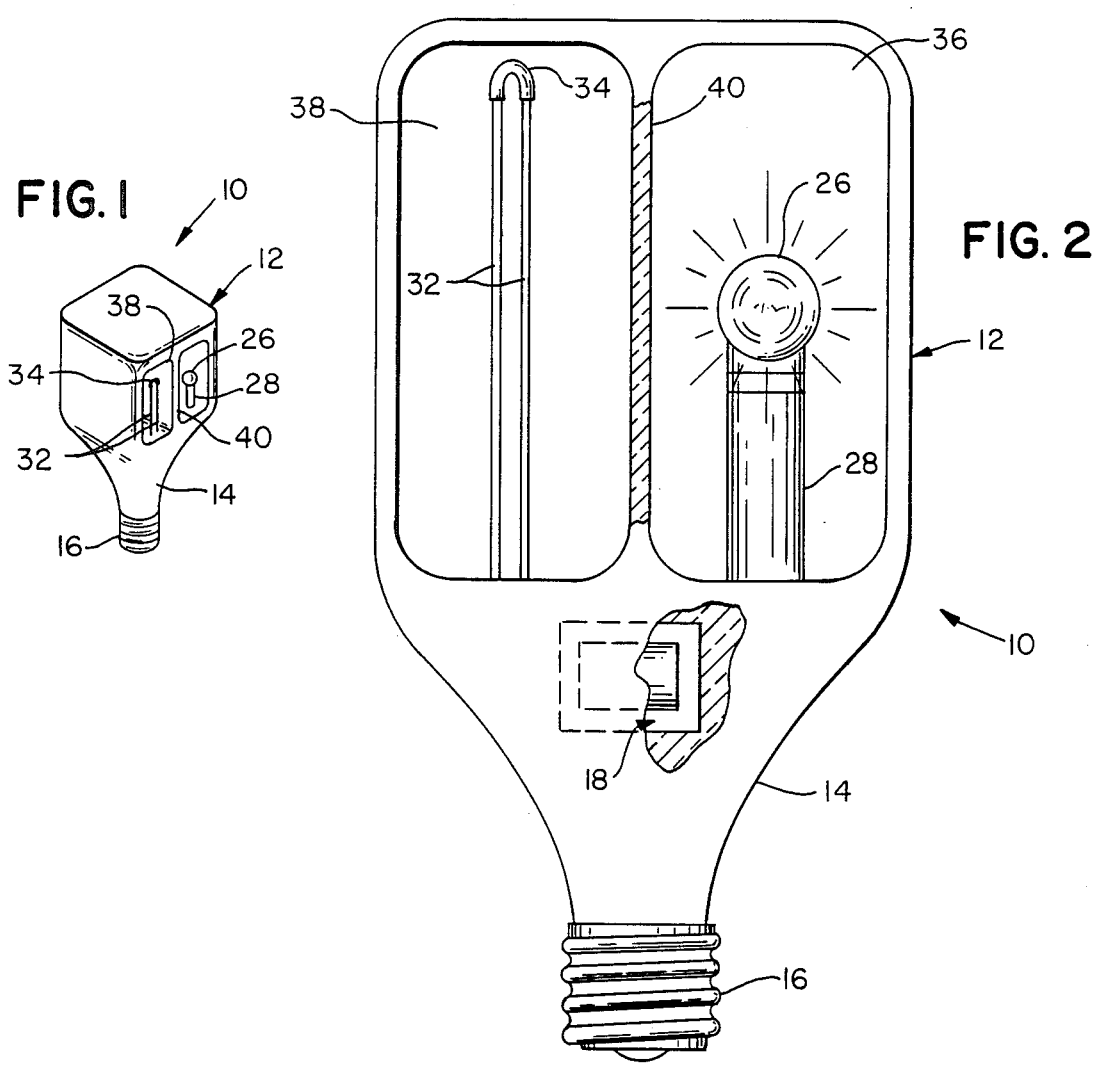

BUG WHACKER LIGHT

BACKGROUND OF THE INVENTION

The instant invention relates generally to insect exterminator devices, and more particularly, to a bug whacker light.

Numerous insect exterminator devices have been provided in the prior art that are adapted to catch or kill insects. For example, U.S. Pat. No. 2,674,682 of Hanson, U.S. Pat. No. 2,132,371 of Kriwat et al, and U.S. Pat. No. 1,962,420 of Bradley, all are illustrative of such prior art. While these units may be suitable for the particular purpose to which they address, they would not be as suitable for the purpose of the present invention as hereafter described.

SUMMARY OF THE INVENTION

A primary object of the present invention is to provide a bug whacker light that will overcome the shortcomings of the prior art devices.

Another object is to provide a bug whacker light that will be of such design, as to be placed into a light bulb socket to attract and kill insects.

An additional object is to provide a bug whacker light that will employ high voltage at self-contained electrodes, for killing insects.

A further object is to provide a bug whacker light that is simple and easy to use.

A still further object is to provide a bug whacker light that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention;

FIG. 2 is an enlarged front elevational view of the invention; and

FIG. 3 is a schematic wiring diagram thereof.

DETAILED DESCRIPTION OF THE PREFERRED EMBODIMENTS

Turning now descriptively to the drawings, in which like reference characters denote like elements throughout the several views, a light 10 is shown to include a glass envelope 12 having an integrally attached neck 14 with an externally threaded base 16, for being received in a typical electric bulb socket (not shown). A step-up transformer 18 is provided and encapsulated in the upper portion of neck 14, for providing high voltage for killing insects in a manner which is well known by those skilled in the art but never the less which hereinafter will be described. Transformer 18 of the circuit 20 includes its primary winding 22 wired across wires 24 that supply current to a high intensity bulb 26 that is received in a socket post 28 of the envelope 12, and the high voltage secondary winding 30 of transformer 18 is connected at its ends to a pair of spaced and vertical electrodes 32 that are fixedly secured in envelope 12. An insulator 34 is fixedly secured to the top ends of the electrodes 32 for keeping electrodes 32 spaced apart, and the bottom of socket post 28 that supports the bulb 26, is fixedly secured in the bottom of one of the open compartments 36 and 38 that are defined by a center divider wall 40 that is integrally attached in envelope 12. As shown in FIGS. 1 and 2, the compartments 36 and 38 have openings in side-by-side relation and facing in the same direction.

It shall be noted that the upper portions including the divider wall 40, are transparent for light transmission to attract insects for their extermination.

In operation, electric current travels from the base 16 to the bulb 26 and also through the primary winding 22 of the transformer. The current from the primary winding 22 is induced into the high voltage secondary winding 30 of the transformer 18, and insects being attracted to the light emitted from the bulb 26, will eventually touch the electrodes 32 and be electrocuted by a high voltage discharge thereof.

In operative use the device is to be constructed of such a size that it can be substituted in an ordinary light bulb socket and supply a sufficient amount of light for inhabitants of the space while still serving the dual purpose of killing flying insects.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An insect killing light comprising:
   a glass envelope having a transparent central divider wall integrally attached in said envelope defining first and second compartments having respective openings in side-by-side relation and facing in the same direction,
   threaded base means for the envelope for receipt in a light bulb socket,
   a high voltage circuit means in said envelope and including a pair of electrodes that are spaced apart and are fixedly secured in said envelope at one end and that extend, spaced apart, upwardly within the first compartment providing a means for killing the insects, and
   an electric light bulb mounted in said second compartment for illuminating the surrounding space while also attracting insects.

2. An insect killing light as set forth in claim 1, wherein an insulator is fixedly secured to other ends of said pair of electrodes and keep said electrodes spaced apart, and said one ends are also fixedly secured to a high voltage secondary winding of a step-up transformer of said high voltage circuit means, whereby said insects when contacting said pair of electrodes are killed by high voltage discharge from said secondary winding.

3. An insect killing light as set forth in claim 2, wherein said transformer is fixedly secured and encapsulated in a neck portion integrally attached to said envelope, and a primary winding of said transformer is secured across wires of said threaded base means that is fixedly secured to said neck portion of said envelope, and said wires of said threaded base means are fixedly secured to a socket post receiving said electric light bulb, and said socket post is fixedly secured in a bottom portion of said second compartment and extends upward and said bulb when lit transmits light through all of an upper portion of said envelope for insect attraction.

4. An insect killing light as set forth in claim 1, wherein the electrodes are spaced apart from said divider wall.

5. An insect killing light as set forth in claim 4, wherein an insulator is secured to the other ends of the electrodes to maintain them spaced apart.

* * * * *